(12) United States Patent
Jing et al.

(10) Patent No.: US 7,836,050 B2
(45) Date of Patent: Nov. 16, 2010

(54) RANKING CONTENT BASED ON RELEVANCE AND QUALITY

(75) Inventors: Feng Jing, Beijing (CN); Lei Zhang, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1027 days.

(21) Appl. No.: 11/339,295

(22) Filed: Jan. 25, 2006

(65) Prior Publication Data

US 2007/0174872 A1 Jul. 26, 2007

(51) Int. Cl.
*G06F 17/30* (2006.01)
*G06F 7/00* (2006.01)

(52) U.S. Cl. ...................... 707/728; 382/305
(58) Field of Classification Search .............. 707/3, 707/728; 382/305
See application file for complete search history.

(56) References Cited

U.S. PATENT DOCUMENTS

| | | | |
|---|---|---|---|
| 4,888,646 A * | 12/1989 | Umeda et al. ............. 358/464 |
| 5,301,018 A * | 4/1994 | Smidth et al. .......... 375/240.24 |
| 5,579,471 A * | 11/1996 | Barber et al. ............. 715/700 |
| 5,642,433 A * | 6/1997 | Lee et al. ................... 382/199 |
| 5,751,286 A * | 5/1998 | Barber et al. ............. 715/835 |
| 5,802,361 A * | 9/1998 | Wang et al. ............... 382/217 |
| 5,870,740 A | 2/1999 | Rose et al. |
| 5,875,446 A | 2/1999 | Brown et al. |
| 5,937,422 A | 8/1999 | Nelson et al. |
| 5,987,456 A * | 11/1999 | Ravela et al. ................ 707/5 |
| 6,006,218 A | 12/1999 | Breese et al. |
| 6,041,323 A | 3/2000 | Kubota |
| 6,097,389 A | 8/2000 | Morris et al. |
| 6,115,717 A * | 9/2000 | Mehrotra et al. ........... 707/102 |
| 6,128,613 A | 10/2000 | Wong et al. |
| 6,134,541 A | 10/2000 | Castelli et al. |
| 6,167,397 A | 12/2000 | Jacobson et al. |
| 6,240,378 B1 | 5/2001 | Imanaka et al. |
| 6,256,623 B1 | 7/2001 | Jones |
| 6,317,748 B1 | 11/2001 | Menzies et al. |

(Continued)

FOREIGN PATENT DOCUMENTS

EP 0 750 254 12/1996

(Continued)

OTHER PUBLICATIONS

Brin, Sergey and Lawrence Page, "The anatomy of a large-scale hypertextual (Web) search engine," In the 7th International World Wide Web Conference, 1998.

(Continued)

*Primary Examiner*—John E Breene
*Assistant Examiner*—Joshua Bullock
(74) *Attorney, Agent, or Firm*—Perkins Coie LLP

(57) ABSTRACT

A method and system for ranking content and providing a user interface for viewing the content is provided. The content system ranks content in a search result based on a combination of relevance of the content to a query and quality of the content. The content system may derive the quality of content by analyzing ratings provided by various content forums. The content system may use metadata provided by a content forum when searching for content that matches a query. The content system generates a rank score that combines the relevance and quality of the content and ranks the content according to the rank scores.

7 Claims, 12 Drawing Sheets

U.S. PATENT DOCUMENTS

| | | | |
|---|---|---|---|
| 6,321,226 B1 | 11/2001 | Garber et al. | |
| 6,363,373 B1 | 3/2002 | Steinkraus | |
| 6,370,527 B1 | 4/2002 | Singhal | |
| 6,445,834 B1* | 9/2002 | Rising, III | 382/305 |
| 6,470,307 B1 | 10/2002 | Turney et al. | |
| 6,473,753 B1 | 10/2002 | Katariya et al. | |
| 6,493,719 B1 | 12/2002 | Booth et al. | |
| 6,522,782 B2* | 2/2003 | Pass et al. | 382/218 |
| 6,523,021 B1 | 2/2003 | Monberg et al. | |
| 6,549,897 B1 | 4/2003 | Katariya et al. | |
| 6,556,710 B2* | 4/2003 | Pass et al. | 382/170 |
| 6,567,936 B1 | 5/2003 | Yang et al. | |
| 6,578,032 B1 | 6/2003 | Chandrasekar et al. | |
| 6,606,659 B1 | 8/2003 | Hegli et al. | |
| 6,643,641 B1 | 11/2003 | Snyder | |
| 6,704,729 B1 | 3/2004 | Klein et al. | |
| 6,728,752 B1 | 4/2004 | Chen et al. | |
| 6,748,387 B2 | 6/2004 | Garber et al. | |
| 6,748,398 B2* | 6/2004 | Zhang et al. | 707/104.1 |
| 6,766,320 B1 | 7/2004 | Wang et al. | |
| 6,775,666 B1 | 8/2004 | Stumpf et al. | |
| 6,816,850 B2 | 11/2004 | Culliss | |
| 6,823,335 B2 | 11/2004 | Ikeda et al. | |
| 6,847,733 B2* | 1/2005 | Savakis et al. | 382/225 |
| 6,892,245 B1 | 5/2005 | Crump et al. | |
| 6,895,552 B1 | 5/2005 | Balabanovic et al. | |
| 6,901,411 B2* | 5/2005 | Li et al. | 707/104.1 |
| 6,920,448 B2 | 7/2005 | Kincaid et al. | |
| 6,944,612 B2 | 9/2005 | Roustant et al. | |
| 6,970,923 B1 | 11/2005 | Mukaiyama et al. | |
| 6,978,275 B2 | 12/2005 | Castellanos et al. | |
| 7,010,751 B2 | 3/2006 | Shneiderman | |
| 7,017,114 B2 | 3/2006 | Guo et al. | |
| 7,047,482 B1 | 5/2006 | Odom | |
| 7,051,019 B1 | 5/2006 | Land et al. | |
| 7,065,520 B2 | 6/2006 | Langford et al. | |
| 7,099,860 B1* | 8/2006 | Liu et al. | 707/3 |
| 7,111,002 B2* | 9/2006 | Zhang et al. | 707/5 |
| 7,113,944 B2* | 9/2006 | Zhang et al. | 707/5 |
| 7,158,878 B2 | 1/2007 | Rasmussen et al. | |
| 7,162,468 B2 | 1/2007 | Schwartz et al. | |
| 7,287,012 B2 | 10/2007 | Corston et al. | |
| 7,349,899 B2 | 3/2008 | Namba | |
| 7,430,566 B2* | 9/2008 | Li et al. | 707/104.1 |
| 7,492,921 B2* | 2/2009 | Foote | 382/100 |
| 7,499,916 B2* | 3/2009 | Liu et al. | 707/3 |
| 2001/0020238 A1 | 9/2001 | Tsuda | |
| 2001/0049700 A1 | 12/2001 | Ichikura | |
| 2002/0035573 A1 | 3/2002 | Black et al. | |
| 2002/0042793 A1 | 4/2002 | Choi | |
| 2002/0042847 A1 | 4/2002 | Takats et al. | |
| 2002/0052894 A1 | 5/2002 | Bourdoncle et al. | |
| 2002/0055936 A1 | 5/2002 | Cheng et al. | |
| 2002/0103890 A1 | 8/2002 | Chaudhuri et al. | |
| 2002/0194166 A1 | 12/2002 | Fowler | |
| 2003/0023600 A1 | 1/2003 | Nagamura et al. | |
| 2003/0061334 A1 | 3/2003 | Hirata et al. | |
| 2003/0063131 A1 | 4/2003 | Ma | |
| 2003/0126235 A1 | 7/2003 | Chandrasekar et al. | |
| 2003/0140033 A1 | 7/2003 | Iizuka et al. | |
| 2003/0142123 A1 | 7/2003 | Malamud et al. | |
| 2003/0144994 A1 | 7/2003 | Wen et al. | |
| 2004/0015461 A1 | 1/2004 | Lo | |
| 2004/0044469 A1 | 3/2004 | Bender et al. | |
| 2004/0111438 A1 | 6/2004 | Chitrapura et al. | |
| 2004/0225667 A1 | 11/2004 | Hu et al. | |
| 2004/0236760 A1 | 11/2004 | Arkeketa et al. | |
| 2004/0249774 A1 | 12/2004 | Caid et al. | |
| 2004/0267740 A1* | 12/2004 | Liu et al. | 707/3 |
| 2005/0015366 A1 | 1/2005 | Carrasco et al. | |
| 2005/0022106 A1 | 1/2005 | Kawai et al. | |
| 2005/0027377 A1 | 2/2005 | Lucas et al. | |
| 2005/0086337 A1 | 4/2005 | Quittek et al. | |
| 2005/0097475 A1 | 5/2005 | Makioka et al. | |
| 2005/0108200 A1 | 5/2005 | Meik et al. | |
| 2005/0144158 A1 | 6/2005 | Capper et al. | |
| 2005/0165841 A1 | 7/2005 | Kasperkiewicz et al. | |
| 2005/0188326 A1 | 8/2005 | Ikeda | |
| 2006/0025985 A1 | 2/2006 | Vinberg et al. | |
| 2006/0026152 A1 | 2/2006 | Zeng et al. | |
| 2006/0117003 A1 | 6/2006 | Ortega et al. | |
| 2006/0242178 A1 | 10/2006 | Butterfield et al. | |
| 2007/0005320 A1 | 1/2007 | Vinberg et al. | |
| 2007/0073748 A1 | 3/2007 | Barney | |
| 2007/0174269 A1 | 7/2007 | Jing et al. | |
| 2007/0174790 A1 | 7/2007 | Jing et al. | |
| 2007/0198182 A1 | 8/2007 | Singh | |
| 2008/0086468 A1 | 4/2008 | Jing et al. | |
| 2008/0086686 A1 | 4/2008 | Jing | |
| 2008/0189253 A1 | 8/2008 | Oliver et al. | |

FOREIGN PATENT DOCUMENTS

| | | |
|---|---|---|
| EP | 0 784 259 | 7/1997 |
| KR | 10-2001-0105051 A | 11/2001 |
| KR | 10-2002-0000680 A | 1/2002 |
| KR | 10-2003-0023950 A | 3/2003 |

OTHER PUBLICATIONS

Broder, Andrei, "A taxonomy of web search," SIGIR Forum 36(2), 2002, 8 pages.

Chau, Michael et al., "Personalized Spiders for Web Search and Analysis," JCDL'01, Jun. 24-28, 2001, Roanoke, Virginia, © 2001, ACM.

Chen, Hao and Susan Dumais, "Bringing Order to the Web: Automatically Categorizing Search Results," Proceedings of CHI'00, Human Factors in Computing Systems, pp. 145-152.

Dumais, Susan, Edward Cutrell and Hao Chen, "Optimizing Search by Showing Results in Context," SIGCHI'01, Mar. 31-Apr. 4, 2001, Seattle, Washington, © 2001 ACM.

Glance, Natalie S., "Community Search Assistant," IU1'01, Jan. 14-17, 2001, Santa Fe, New Mexico, © 2001 ACM, pp. 91-96.

Google web search, http://www.google.com, [last accessed Jun. 7, 2007].

Halkidi, Maria et al., "THESUS: Organizing Web document collections based on link semantics," the VLDB Journal (2003) / Digital Object Identifier, © Springer-Verlag 2003, pp. 1-13.

Han, Eui-Hong et al., "Intelligent Metasearch Engine for Knowledge Management", CIKM'03 Nov. 2003, pp. 492-495, ACM, New Orleans, Louisiana.

Hearst, Marti A. and Jan O. Pedersen, "Reexamining the Cluster Hypothesis: Scatter/Gather on Retrieval Results," in the Proceedings of ACM SIGIR, Aug. 1996, Zurich.

Huang, Jing et al., "Image Indexing using color correlograms," in Proc. IEEE Comp. Soc. Conf. Comp. Vis. and Patt. Rec., 1997, pp. 762-768.

Jansen, Major Bernard J. et al., "Real life information retrieval: a study of user queries on the Web," ACM SIGIR Forum 1998, vol. 32, No. 1, pp. 5-17.

Krishnapuram, Raghu et al., "Low-Complexity Fuzzy Relational Clustering Algorithms for Web Mining," Aug. 2001, IEEE, vol. 9, Issue 4, pp. 595-607.

Kummamuru, Krishna, et al., "A Hierarchical Monothetic Document Clustering Algorithm for Summarization and Browsing Search Results", WWW 2004, May 2004, pp. 658-665, ACM, New York, NY.

Liu, Bing et al. "Mining Topic-Specific Concepts and Definitions on the Web," WWW 2003, May 20-24, 2003, Budapest, Hungary, ACM.

Mana-Lopez, Manuel et al., "Multidocument Summarization: Added Value to Clustering in Interactive Retrieval, ACM Transactions on Information Systems", Apr. 2004, pp. 215-241, vol. 22 No. 2. ACM.

MSRA clustering search, http://rwsm.directtaps.net/, [last accessed Jun. 7, 2007].

Ong, Hwee-Leng et al., "FOCI: Flexible Organizer for Competitive Intelligence," Proceedings of the 10th International Conference on Information and Knowledge Management, Oct. 5-10, 2001, Atlanta, Georgia, http://www.ntu.edu.sg/home/asahtan/Papers/foci_itwp01.pdf, [last accessed Jan. 3, 2008].

Roussinov, Dmitir et al., "Visualizing Internet Search Results with Adaptive Self-Organizing Maps," 1999, http://www.public.asu.edu/~droussi/sigir99/demo.htm, [last accessed Dec. 7, 2007].

Schwartz, Steve, Visual Quick Project Guide: Organizing and Editing Your Photos with Picasa, May 10, 2005, Chapter 4.

Sclaroff, Stan, Leonid Taycher and Marco Lacascia, "ImageRover: A Content-Based Image Browser for the World Wide Web," In IEEE Workshop on Content-based Access of Image and Video Libraries, San Juan, Puerto Rico, Jun. 1997, pp. 2-9.

Smeulders, Arnold W.M. et al., "Content-Based Image Retrieval at the End of the Early Years," IEEE Transactions on Pattern Analysis and Machine Intelligence, vol. 22, No. 12, Dec. 2000, pp. 1349-1380, © 2000 IEEE.

Teevan, Jaime et al., "The Perfect Search Engine Is Not Enough: A Study of Orienteering Behavior in Directed Search," CHI 2004, Apr. 24-29, Vienna, Austria, pp. 415-422.

Toyama, Kentaro et al., "Geographic Location Tags on Digital Images," MM'03, Nov. 2-8, 2003, Berkeley, California, © 2003 ACM.

Vivisimo clustering search, http://vivisimo.com, [last accessed Jun. 7, 2007].

Wang, Yitong et al., "Evaluating Contents-Link Coupled Web Page Clustering for Web Search Results", CIKM'02, Nov. 2002, pp. 499-506, ACM, McLean, VA.

White, David A. and Ramesh Jain, "Similarity Indexing: Algorithms and Performance," 2 / SPIE, Feb. 1-2, 1996, San Jose, California, vol. 2670, pp. 63-73, © 1996 The Society of Photo-Optical Instrumentation Engineers.

Wu, Yi-Fang et al., "Finding More Useful Information Faster from Web Search Results", CIKM'03, Nov. 2003, pp. 568-571, ACM, New Orleans, Louisiana.

Yahoo Homepage search, http://www.yahoo.com/, [last accessed Jun. 7, 2007].

Zamir, Oren and Oren Etzioni, "Web Document Clustering: A Feasibility Demonstration," In Proceedings of SIGIR'98, Melbourne, Australia, pp. 46-54, © 1998 ACM.

Zeng, H.J. et al, "Learning to Cluster Web Search Results," SIGIR'04, Jul. 25-29, 2004, Sheffield, South Yorkshire, UK, © 2004 ACM.

Zhang, L. et al., "Enjoy High Quality Photos in Vertical Image Search Engine," Submitted to the SIGCHI 2006 Conference on Human Factors in Computing Systems.

International Search Report and Written Opinion; International Patent No. PCT/US2007/079983; Filed: Sep. 28, 2007; Applicant: Microsoft Corporation; Mailed on Jan. 16, 2008.

U.S. Appl. No. 11/548,253, Jing et al.

Cai, Deng et al., "Hierarchical Clustering of WWW Image Search Results Using Visual, Textual and Link Analysis," MM'04, Oct. 10-16, 2004 New York, New York, © 2004 ACM.

Chang, Shi Kuo and Arding Hsu, "Image Information Systems: Where do we go from here?," IEEE Transactions on Knowledge and Data Engineering, vol. 4, No. 5, Oct. 1992, pp. 431-442.

Lempel, Ronny and Aya Soffer, "PicASHOW: Pictorial Authority Search by Hyperlinks on the Web," Proceedings of the 10th International WWW Conference, Hong Kong, China, 2001, ACM, pp. 438-448.

Luo, Bo, Xiaogang Wang and Xiaoou Tang, "A World Wide Web Based Image Search Engine Using Text and Image Content Features," Internet Imaging IV, Proceedings of SPIE-IS&T, Electronic Imaging, SPIE, vol. 5018, 2003, © 2003 SPIE-IS&T, pp. 123-130.

Mukherjea, Sougata, Kyoji Hirata and Yoshinori Hara, "Using Clustering and Visualization for Refining the Results of a WWW Image Search Engine," NPIV 98, Bethesda, Maryland, © ACM 2000, pp. 29-35.

Photosig, http://www.photosig.com, [last accessed Aug. 17, 2006].

Rui, Yong and Thomas S. Huang, "Image Retrieval: Current Techniques, Promising Directions and Open Issues", Journal of Visual Communication and Image Representation, vol. 10, 39-62, Mar. 1999, © 1999 by Academic Press.

Shen, Heng Tao et al., "Giving Meanings to WWW Images," Proceedings of ACM Multimedia 2000, Los Angeles, CA, pp. 39-47, © ACM 2000.

Wang, Xin-Jing et al., "Grouping Web Image Search Result," MM'04, October 10-16, 2004, New York, New York, pp. 436-439, © 2004 ACM.

Woodruff, Allison et al., "Using Thumbnails to Search the Web," Proceedings of SIGCHI, Mar. 31-Apr. 4, 2001, Seattle, Washington, pp. 198-205, © 2001 ACM.

U.S. Appl. No. 11/339,326, Jing et al.

U.S. Appl. No. 11/339,328, Jing et al.

Altavista image, http://www.altavista.com/images, one page [last accessed Jul. 14, 2006].

Chen, Zheng et al., "iFind: A Web Image Search Engine," In Proc. ACM SIGIR, 2001, one page.

Citeseer, Scientific Literature Digital Library, http://citeseer.ist.psu.edu, one page [last accessed Jul. 14, 2006].

Ditto, http://ditto.com/, one page [last accessed Jul. 14, 2006].

Frankel, Charles, Michael J. Swain and Vassilis Athitsos, "WebSeer: An Image Search Engine for the World Wide Web," Aug. 1, 1996, Technical Report 96-14, The University of Chicago, Computer Science Department, pp. 1-24.

Froogle, Google product search, http://froogle.google.com, one page [last accessed Jul. 14, 2005].

Google Maps, Google local search, http://local.google.com/, one page [last accessed Jul. 14, 2006].

Google, Google Image Search, http://images.google.com, one page [last accessed Jul. 14, 2006].

GoogleNews, Google news search, http://news.google.com, 4 pages [last accessed Jul. 14, 2006].

GoogleVideo, Google video search, http://video.google.com, one page [last accessed Jul. 14, 2006].

Huang, Xiaodi and Wei Lai, "Force-Transfer: A New Approach to Removing Overlapping Nodes in Graph Layout," In Proc. The 25th Australasian Computer Science Conference 2003, Conferences in Research and Practice in Information Technology, vol. 16, © 2003 Australian Computer Society, 10 pages.

IMDB, Formula for calculating the top rated 250 titles in imdb, http://www.imdb.com/chart/top, 8 pages [last accessed Jul. 14, 2006].

Li, Zhiwei et al., "Grouping WWW Image Search Results by Novel Inhomogeneous Clustering Method," Proceedings of the 11th International Multimedia Modelling Conference (MMM '05), © 2005 IEEE, 7 pages.

Liu, Hao et al., "Effective Browsing of Web Image Search Results," MIR '04, New York, © 2004 ACM, 7 pages.

Nie, Zaiqing et al., "Object-level Web Information Retrieval," Technical Report of Microsoft Research, MSR-TR-2005-11, 2005, 8 pages.

Nie, Zaiqing, Yuanzhi Zhang, Ji-Rong Wen and Wei-Ying Ma, "Object-Level Ranking: Bringing Order to Web Objects," WWW 2005, Chiba, Japan, ACM 2005, 8 pages.

Page, L. et al., "The PageRank Citation Ranking: Bringing Order to the Web," Jan. 29, 1998, Stanford University Technical Report, pp. 1-17.

PicSearch, http://www.picsearch.com, one page [last accessed Jul. 14, 2006].

Sarkar, Manojit and Marc H. Brown, "Graphical Fisheye Views," Communications of the ACM, Dec. 1994, vol. 37, No. 12, © ACM, pp. 73-84.

Savakis, Andreas E., Stephen P. Etz and Alexander C. Loui, "Evaluation of image appeal in consumer photography," In Proceedings SPIE Human Vision and Electronic Imaging V, Jan. 2000, pp. 1-10.

Scholar, Google scholar paper search, http://Scholar.google.com, one page [last accessed Jul. 14, 2006].

Sclaroff, Stan, Marco La Cascia and Saratendu Sethi, "Unifying Textual and Visual Cues for Content-Based Image Retrieval on the World Wide Web," Computer Vision and Image Understanding, Vo. 75, Nos. 1/2, Jul./Aug. 1999, © 1999 by Academic Press, pp. 86-98.

Smith, John R. and Shih-Fu Chang, "Visually Searching the Web for Content," IEEE Multimedia, Jul.-Sep., vol. 4, No. 3, 1997, © 1997 IEEE, pp. 12-20.

Sullivan, Danny, "Hitwise Search Engine Ratings," Search Engine Watch, www.searchenginewatch.com, Aug. 23, 2005, Incisive Interactive Marketing LLC, 2005, 3 pages.

Susstrunk, Sabine and Stefan Winkler, "Color Image Quality on the Internet," in IS&T/SPIE Electronic Imaging 2004: Internet Imaging V, vol. 5304, 2004, pp. 118-131.

Tong, Hanghang et al., "Classification of Digital Photos Taken by Photographers or Home Users," In Proceedings of Pacific-Rim Conference on Multimedia (PCM), 2004, pp. 198-205.

Wang, Bin et al., "Large-Scale Duplicate Detection for Web Image Search," 4 pages.

Xi, Wensi et al., Link Fusion: A Unified Link Analysis Framework for Multi-Type Interrelated Data Objects, WWW 2004, New York, © ACM, pp. 319-327.

Yahoo image search, http://images.yahoo.com, one page [last accessed Jul. 14, 2006].

Yee, Ka-Ping et al., "Faceted Metadata for Image Search and Browsing," In Proc. CHI 2003, Florida, © 2003 ACM, 8 pages.

Wies, Rene, "Policies in Network and Systems Management—Formal Definition and Architecture," Journal of Network and Systems Management, Plenum Publishing Corp., vol. 2, No. 1, pp. 63-83, Mar. 1994.

Fullford, Eborah, et al., A Federation Tool: Using the Management Object Model (MOM) to Manage, Monitor and Control an HLA Federation, 1999 (5 pages).

Deng Cai 1, Xiaofei He2, Zhiwei Li, Wei-Ying Ma and Ji-Rong Wen, "Hierarchical Clustering of WWW Image Search Results Using Visual," Textual and Link Information, Oct. 10-16, 2004, New York, New York, USA, Copyright 2004 ACM.

Ferragina et al., "The Anatomy of a Clustering Engine for Web-page Snippets," Jan. 29, 2004, University of Pisa, Tech. Report: TR-04-05. http://www.flickr.com, Archived on http://www.archive.org on Feb. 18, 2005, pp. 1-5, available on http://web.archive.org/web/20050218030404/http://flickr.com/.

Indurkhya et al., "Solving Regression Problems with Rule-based Classifiers," Aug. 2001, ACM, pp. 287-292.

Kherfi et al., "Image Retrieval from the World Wide Web Issues," Techniques and Systems, Mar. 2004, ACM Computing Surveys, vol. 36, No. 1, pp. 35-67.

Mysore et al., "DIOGENES: A Distributed Search Agent," May 2003, Technical Reports CSE-2003-24.

Vlachos et al., "Identifying Similarities, Periodicities and Bursts for Online Search Queries," Jun. 13-18, 2004, ACM, pp. 1-12.

Xiaofei He, Wei-Ying Ma, and Hongjiang Zhang, "Imagerank: spectral techniques for structural analysis of image database," Jul. 6-9, 2003, ICME '03, Proceedings of 2003 International Conference, vol. 1, pp. 1-25-1-28.

* cited by examiner

RANKING CONTENT BASED ON RELEVANCE AND QUALITY

BACKGROUND

The Internet is being increasingly used to search for and view images (e.g., photographs). To support this use, commercial search engine services have located and indexed over 1 billion images since 2005. Users who search for images often want to locate and view images of high quality. For example, a user interested in nature may want to view and purchase nature-related photographs that are of high quality. After locating images that match a query, these search engines typically display the located images in an order that is based on relevance of the image to the query. These search engines may calculate relevance based on similarity between the terms of the query and metadata (e.g., title) associated with the located images. Although domain-specific or vertical search engines may be effective at locating images in a particular domain (e.g., nature), these search engines may have no practical way of determining the quality of the images. Thus, a user may need to view many pages of images before finding a high-quality image that is of interest to the user.

The quality of an image can be rated either subjectively (e.g., manually) or objectively (e.g., automatically). A person can subjectively rate the quality of an image by viewing the image and assigning a rating of, for example, between 1 and 10. Because of the vast resources that would be needed to manually rate a billion images, a subjective rating of each image is currently impracticable. Various algorithms have been developed to objectively rate images. Some simple rating algorithms focus on attributes such as image size and color versus black and white to rate the quality of an image. Such simple objective rating algorithms do not provide an "artistic" or "aesthetic" quality rating as provided by a subjective rating. Some objective rating algorithms assess the content of an image to provide a more artistic quality rating. Most of these algorithms, however, are based on colorfulness, contrast, and sharpness analysis. These algorithms fall short of providing an artistic quality rating comparable to a person's subjective rating.

Search engines typically display the images of a search result as thumbnails in a grid form. A user can locate an image of interest by scrolling through the grid viewing the thumbnails. When the user selects an image that may be of interest, an enlarged version of the image may be displayed in a separate window. After viewing the enlarged version of the image, the user may decide to download the image. A user who is looking for many images may store the downloaded images in a folder on a local storage device. There are, however, several disadvantages to such a user interface for viewing and then downloading images. First, as discussed above, because the thumbnails are ordered by relevance to the input query, a user may need to browse many pages of thumbnails to find a high-quality image of interest. Second, the thumbnails may be too small to allow the user to effectively assess the quality of the images. As a result, the user may need to repeat the process of selecting a thumbnail from a window containing the grid of thumbnails, viewing the selected image in a separate window, and changing the focus back to the grid. In addition, once a user decides to download an image, the user needs to save the image to the appropriate folder. The process of selecting thumbnails and viewing images in separate windows can be time-consuming and distracting to the user, who may not be able to effectively assess and remember the relative quality of the different images.

SUMMARY

A method and system for ranking content and providing a user interface for viewing the content is provided. The content system ranks content in a search result based on a combination of relevance of the content to a query and quality of the content. The content system may derive the quality of content by analyzing ratings provided by various content forums or may derive the quality in other ways manually or automatically. The content system may use metadata provided by a content forum when searching for content that matches a query. The content system generates a rank score that combines the relevance and quality of the content and ranks the content according to the rank scores.

The content system may normalize the ratings of the various content forums to account for differences in rating scales and rating criteria. A rating scale refers to the range of ratings that can be assigned to content. The rating criteria refer to the criteria by which the quality of content is judged. The content system may scale the ratings of content forums to a standard scale. The content system may also transform the ratings of content forums to match the ratings of reference content, such as from a reference content forum, to help account for differences in rating criteria. To transform the ratings, the content system may identify duplicate content in a target content forum and reference content. The content system uses the duplicate content as a basis for generating a transform that transforms the ratings of a target forum to the ratings of the reference content.

The content system may provide a user interface for viewing images of a search result in place within an image grid, rather than viewing the images in a different window from the window in which the image grid is displayed. The content system may provide a modified fisheye view of the image grid when a user selects an image. The content system may also allow a user to select one or more images of a search result to be automatically added to a slideshow. The content system may display a window with a grid area and a slideshow area. The grid area contains thumbnails of the images of the result arranged in a grid, and the slideshow area contains thumbnails of the images that have been added to a slideshow. The content system may allow a user to drag thumbnails from the grid area to the slideshow area and may automatically add the image corresponding to the thumbnail to the slideshow. The content system may provide to a user recommendations of images that may be of interest to the user. When an image is selected as the basis of a recommendation, the content system may identify images that have a relationship to the selected image and then recommend the identified images to the user. The content system may use the slideshows to indicate relationships between images of each slideshow.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
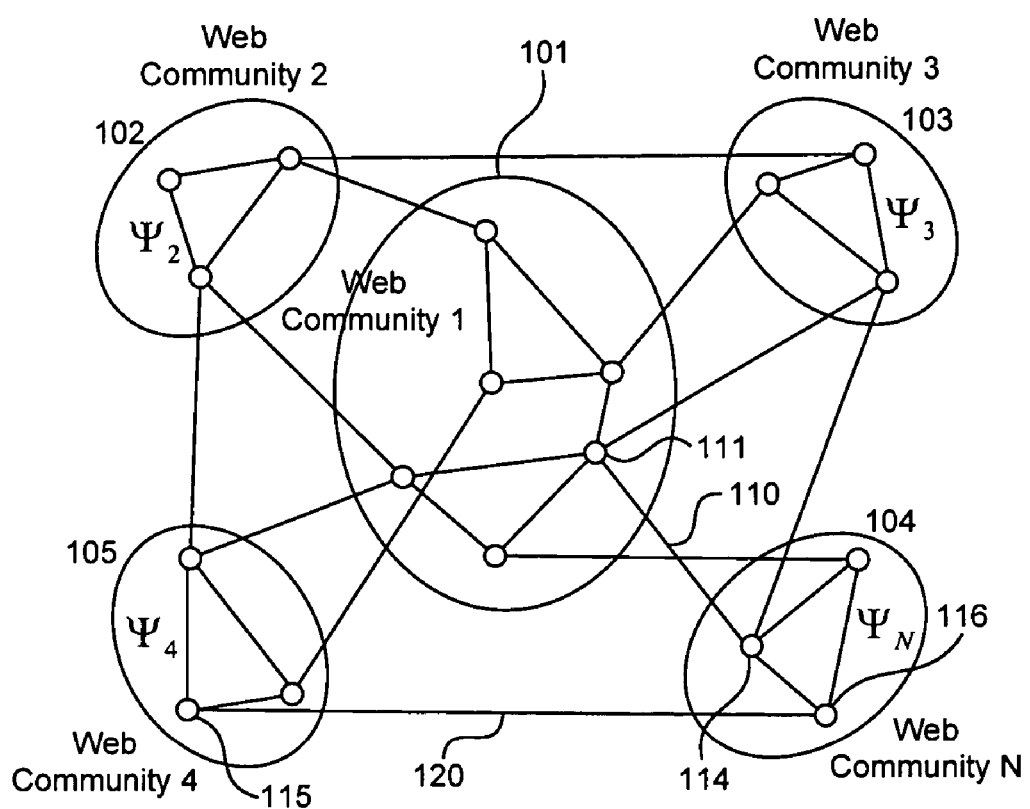
FIG. 1 is a diagram that illustrates implicit relationships between duplicate images of various image forums.

A method and system for ranking content and providing a user interface for viewing the content is provided. In one embodiment, the content system ranks the items of a search result based on a combination of relevance of the item to the query and quality of the item. For example, when the items are images, the content system generates a score for each image based on the relevance as assigned by a search engine and the quality of the image that may be determined objectively or subjectively. In one embodiment, the content system may derive the quality of content by analyzing ratings provided by various content forums. In particular, web-based image forums are an increasingly popular mechanism for people to publish their photograph and other images. An image forum allows users to upload their photographs and requires the users to provide associated metadata such as title, camera setting, category, and description. The content system may use this metadata when searching for images that match a query. For example, the content system may search the title, category, and description metadata when determining whether an image matches a query. The image forums typically allow reviewers to rate each of the uploaded images. An image forum may have a group of designated reviewers who perform the rating or may allow any user to act as a reviewer and rate an image. The content system derives the quality of the image from the ratings of that image provided by one or more image forums. In this way, the content system can automatically leverage the ratings provided by image forums to avoid having to manually determine anew the quality of an image or to automatically determine the quality based on the content of the image. The content system can be used to rank content other than images or photographs. For example, the content system can be used to rank content that includes video clips, poems, short stories, drawings, sculptures, and so on. The content system may use the ratings provided by various content forums to derive the quality of content. For example, a poetry forum may contain poems uploaded by their authors and may have poetry reviewers rate the poems. In the following, the content system for processing images is described. The content system can, however, be used to process various types of content.

In one embodiment, the content system normalizes the ratings of the various image forums. The content system may normalize the ratings to account for differences in rating scales and rating criteria. A rating scale refers to the range of ratings that can be assigned to an image. A rating scale typically has a minimum and a maximum value with a higher value indicating that the image is of higher quality. For example, one image forum may rate images on a scale of 1 to 10, and another image forum may rate images on a scale of 1 to 3. The rating criteria refer to the criteria by which the quality of an image is judged. The rating criteria may be explicit or implicit. An image forum may explicitly publish the criteria that are used for judging the quality of images. Rating criteria may be implicit in the collective judgment of the image reviewers as expressed by their individual ratings. The content system may scale the ratings of the image forum to a standard scale (e.g., 1-100). The content system may also transform the ratings of image forums to match the ratings of reference images (e.g., images provided by a reference image forum) to help account for differences in rating criteria. To transform the ratings, the content system identifies the duplicate images in a target image forum and the reference images. Many image forums publish the same image, referred to as a duplicate image. For example, a photographer may upload the same photographs to several different image forums in hopes of widespread publicity. The content system uses the duplicate images as a basis for generating a transform that transforms the rating of a target forum to the ratings of the reference images. The content system generates a transform that transforms the ratings of the duplicate images in the target image forum to be the same as the ratings of those duplicate images in the reference images. The content system then uses the generated transforms for the target image forum to transform the ratings of the non-duplicate images to reflect common rating criteria.

In one embodiment, the content system provides a user interface for viewing images of a search result in place within an image grid, rather than viewing the image in a separate window from the window in which the image grid is displayed. The content system may provide a modified fisheye view of the image grid when a user selects an image. A fisheye view of the images of a grid presents an enlarged image in place with the surrounding images scaled both vertically and horizontally. A fisheye view thus provides an enlarged view of an image at the center of the view but a distorted view of the surrounding thumbnails. The thumbnails in the same row and column as the center image are enlarged in one dimension and compressed in the other dimension. In one embodiment, the content system displays the images in a "modified fisheye view." One modified fisheye view compresses the size of the thumbnails surrounding the image in one dimension but keeps the rows and columns of the surrounding images aligned even though the row and column of the enlarged image are larger. In this modified fisheye view, thumbnails immediately to the left and right of the center image have their heights unchanged, but their widths compressed, and the thumbnails immediately above and below the center image have their widths unchanged, but their heights compressed, but all other surrounding thumbnails are changed in both directions. Another modified fisheye view applies a force transfer algorithm or a force scan algorithm to the center image and surrounding images, which may resize the thumbnails keeping their original aspect ratios and relax the horizontal and vertical alignment requirement. In this way, an enlarged version of an image is displayed in place within the grid so that the user can avoid having to view images in a separate window.

In one embodiment, the content system allows a user to select one or more images of a search result to be automatically added to a slideshow. The content system may display a window with a grid area and a slideshow area. The grid area contains thumbnails of the images of the result arranged in a grid, and the slideshow area contains thumbnails of the images that have been added to a slideshow. The content system may allow a user to drag thumbnails from the grid area to the slideshow area and may automatically add the image corresponding to the thumbnail to the slideshow. The content system may store at a server an indication of the images of a slideshow. The content system may upon user request provide a slideshow to the user by retrieving and displaying the images of a slideshow. The content system may allow a user to have multiple slideshows that may each be identified by a user-supplied name. The content system may also prepare a slideshow package that contains images or links to images of a slideshow along with instructions (e.g., executable code) for presenting the slideshow. A user may distribute the slideshow package to other users for display on their computers. For example, a user may send a slideshow package via electronic mail to another user. The other user may then execute the slideshow package to view the slideshow on their computer.

In one embodiment, the content system provides recommendations of images to a user that may be of interest to the user. When an image is selected (e.g., by a user) as the basis of a recommendation, the content system may identify images that have a relationship to the selected image and then recommend the identified images to the user. The content system may identify images based on various relationships. For example, the content system may cluster images based on metadata associated with the images or the content of the images themselves. The content system may then recommend images within the same cluster as the selected image. The content system may also use the slideshows generated by users as clusters of images. When the selected image is within a slideshow, the content system may identify the other images of the slideshow for recommendation. If the selected image is in multiple slideshows, then the content system may give preference to recommending images that are common to the multiple slideshows. The content system may also not recommend images that are too common in slideshows. For example, an image containing the words "The End" may be in many different slideshows, but may be of no real interest to a user. In this way, the content system may automatically recommend to a user images that have been grouped together in some way to a selected image.

In one embodiment, the content system generates transforms for each image forum that transform the ratings of duplicate images in a target image forum to the ratings of those duplicate images in a reference image forum. The content system may represent the total score and mean score of image i of image forum k as $S_{ki}$ and $\bar{S}_{ki}$, respectively. The total score refers to the sum of the various rating scores (e.g., novelty rating and aesthetic rating), and the mean score refers to the mean of the various rating scores. The content system represents the scores for duplicate images by the following:

$$\{S_i^{ki} | i=1, \ldots, I_{kl}; k, l=1, \ldots, K; k \neq l\} \quad (1)$$

where K is the number of image forums and $I_{kl}$ is the number of duplicate images in image forums k and l. The content system generates a transform for each image forum as represented by the following:

$$\psi_k(\tilde{S}_{ki}) = S_{ki}, k=1, \ldots, K \quad (2)$$

where $S_{ki}$ is the transformed score and $\psi_k$ is the transform for image forum K. The content system attempts to identify a transform for each image forum that minimizes the square of the differences between the scores of the duplicate images of the reference forum and the transformed scores of the duplicate images of the target image forum. The objective function for this minimization problem is represented by the following:

$$\min_{\{\psi_k | k=2,\ldots,K\}} \sum_{k=2}^{K} \sum_{i=1}^{I_{k1}} \bar{\omega}_i^k (S_i^{1k} - \psi_k(S_i^{k1}))^2 \quad (3)$$

where k=1 represents the reference image forum, $\psi_1 = S_{1i}$, and $\bar{w}_i^k$ is a weight coefficient for image i in image forum k. The weight coefficient of an image i in image forum k is based on the number of reviewers in image forum k and in the reference image forum. In general, if there are more reviewers, the image is more popular and the weight should be larger. Moreover, if there are only a few reviewers of an image, then it is possible that its rating may be significantly skewed by one reviewer. In one embodiment, the content system may set the weights to 1 to disregard the differences in the number of reviewers.

In one embodiment, the content system scales the ratings of the different image forums to a standard scale. The content system may scale the mean scores by linearly transforming them to a fixed scale. The difficulty, however, with such a linear scaling of mean scores is that, if there are only a few reviewers of an image, it would be relatively easy for one of the reviewers to skew the mean score. Rather than scale the mean scores to a fixed scale, the content system in one embodiment scales the total scores using a mode and high percentile technique. A total score may also reflect the popularity of an image. That is, users who do not like an image will generally not rate an image, while users who like an image are likely to rate the image. Thus, an image with a high total score is likely a high quality image. According to the mode and high percentile technique, the content system identifies the mode score and a high percentile score of a target image forum and a reference image forum. The mode score represents the total score that has been assigned to more images than any other total score. A high percentile score represents the total score for which that high percentile of images (e.g., 90%) have a lower total score. The images with total scores between the mode score and the high percentile score represent middle-level quality images of the image forums. The mode and high percentile technique thus factors out total scores assigned to both low-quality and high-quality images. The content system then scales the total scores of the images of the target image forum so that the mode score and the high percentile score are close to those scores of the reference image forum.

In one embodiment, the content system may use a transform that is manually generated for each image forum. The content system may represent the manual transform by the following:

$$\tilde{S}_{ki} = \alpha_k \left( \frac{n_k \cdot \bar{S}_{ki}}{n_k + n_k^*} + \frac{n_k^* \cdot S_k^*}{n_k + n_k^*} \right) \quad (4)$$

where $n_k$ represents the number of reviewers for image forum k and $n^*_k$, $S^*_k$, and $a_k$ represent parameters. This equation balances the original mean score $S_{ki}$ and a reference score $S^*_k$ to give a weighted mean score. (See, http://www.imdb.com/chart/top). The equation then scales the weighted mean score by $a_k$ to give the final score $\tilde{S}_{ki}$. Although the generating of a manual transform for an image forum can provide acceptable results, it may be too time-consuming when there are many image forums.

In one embodiment, the content system automatically generates a transform for each image forum based on the scores of images that are duplicated in the image forum and a reference image forum. The content system may identify duplicate images using a principal component analysis to map a high-dimensional feature set describing an image into a 32-bit hash code. Images with the same hash code are potentially duplicates. The content system then performs a more detailed analysis on the potentially duplicate images to determine whether they are indeed duplicates. A technique for identifying duplicate images is described in U.S. patent application Ser. No. 11/233,352, entitled "Generating Search Requests From Multimodal Queries," which is hereby incorporated by reference.

FIG. 1 is a diagram that illustrates implicit relationships between duplicate images of various image forums. Image forums 101-105 contain various images as represented by circles. Image forum 101 is the reference forum. The lines between images in different image forums indicate that the images are duplicates. For example, the line 110 indicates that image 111 of image forum 101 is a duplicate of image 114 of image forum 104. Also, the line 120 indicates that image 115 of image forum 105 is a duplicate of image 116 of image forum 104. Although not shown, each image forum may have many images that are not duplicated in other image forums. The content system generates a transform for each non-reference image forum that attempts to transform each score of a duplicate image of the non-reference image forum to the score of the same duplicate image of the reference image forum. The content system then uses the transform to transform scores of images of the non-reference image forums that are not duplicated in the reference image forum. The effectiveness of the transforms may be evaluated by analyzing the transformed scores of duplicate images between non-reference image forums and in particular the transformed scores of those duplicate images that are also not in the reference image forum. For example, the transforms for image forums 104 and 105 may be more effective when the transformed score of image 115 is similar to that of image 116.

Figure 2:
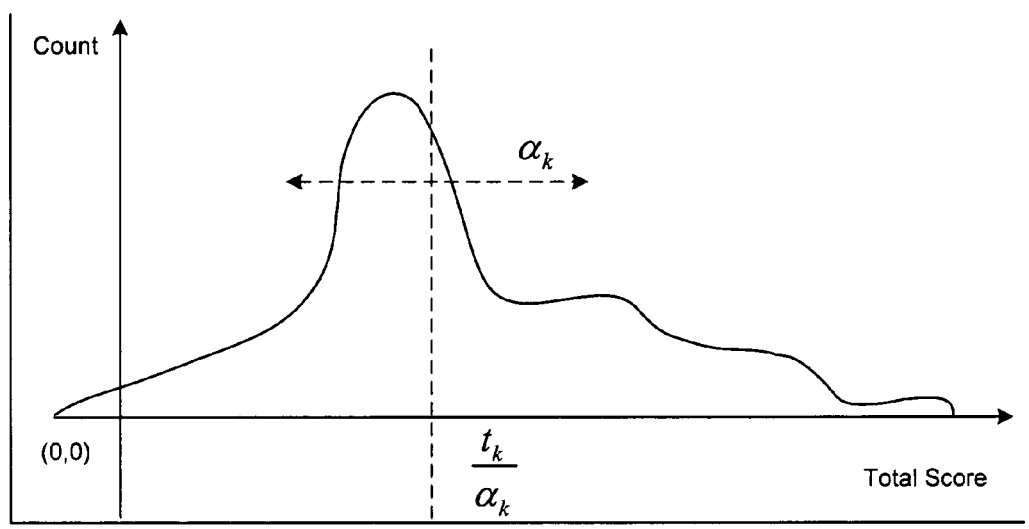
FIG. 2 illustrates the center for an image forum used in transforming.

In one embodiment, the content system uses a linear model for the transforms. The content system represents the linear model by the following:

$$\psi_k(S_{ki}) = \alpha_k S_{ki} + t_k, k=2,\ldots,K \quad (5)$$

$$\psi_1(S_{1i}) = S_{1i} \quad (6)$$

where $\alpha_k$ represents a scale of the scores relative to the center $t_k/(1-\alpha_k)$ for image forum k. FIG. 2 illustrates the center for an image forum used in transforming. When the linear model is substituted into Equation 1, the new equation is represented by the following:

$$\min_{\{\alpha_k, t_k | k=2,\ldots,K\}} \sum_{k=2}^{K} \sum_{i=1}^{I_{k1}} \overline{\omega}_i^k [S_i^{1k} - \alpha_k S_i^{k1} - t_k]^2 \quad (7)$$

The content system then solves for a set of equations as represented by the following:

$$\begin{cases} \dfrac{\partial f}{\partial \alpha_k} = 0 \\ \dfrac{\partial f}{\partial t_k} = 0 \end{cases}, k=1,\ldots,K \quad (8)$$

where $f$ is the objective function of Equation 5. The closed form of the solution is represented by the following:

$$\begin{pmatrix} a_k \\ t_k \end{pmatrix} = A_k^{-1} L_k \quad (9)$$

$$A_k = \begin{pmatrix} \sum_i \overline{\omega}_i (S_i^{k1})^2 & \sum_i \overline{\omega}_i S_i^{k1} \\ \sum_i \overline{\omega}_i S_i^{k1} & \sum_i \overline{\omega}_i \end{pmatrix} \quad (10)$$

$$L_k = \begin{pmatrix} \sum_i \overline{\omega}_i S_i^{1k} S_i^{k1} \\ \sum_i \overline{\omega}_i S_i^{1k} \end{pmatrix} \quad (11)$$

The content system generates the parameters $a_k$ and $t_k$ for each image forum k and then transforms each score of image forum k using the linear model.

Figure 3:
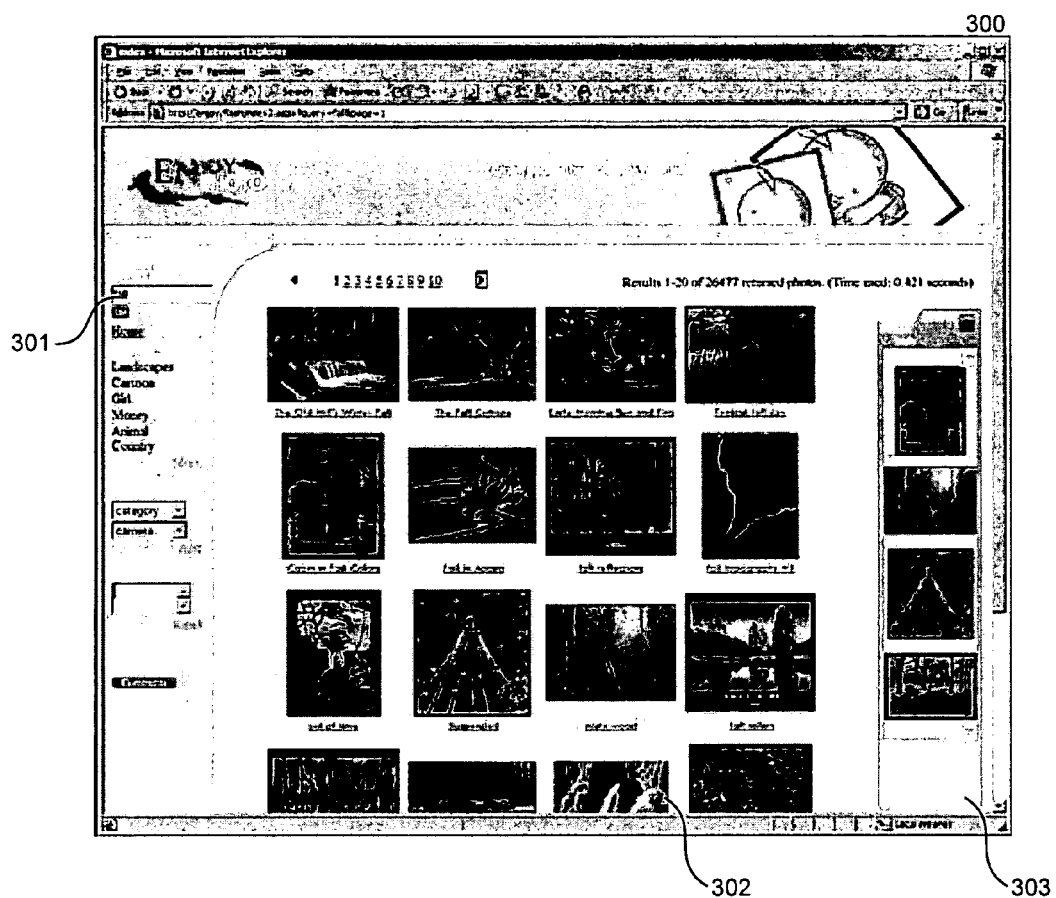
FIG. 3 is a display page that illustrates the presentation of image search results in one embodiment.

FIG. 3 is a display page that illustrates the presentation of image search results in one embodiment. The display page 300 includes a search field 301, a grid area 302, and a slideshow area 303. A user enters a query into the search field, and the content system displays thumbnails of the image results in the grid area. In one embodiment, the content system orders the images based on a ranking derived from a combination of relevance and quality as described above. The content system displays 20 thumbnails at a time in a 5×4 grid. The content system provides buttons for selecting the previous page and next page of thumbnails when the search result contains more than 20 images. The slideshow area contains a thumbnail of each image in the slideshow. A user may add an image to the slideshow by dragging a thumbnail from the grid area to the slideshow area. The content system may allow a user to reorder the images within a slideshow by dragging and dropping them into their reordered position. In addition, the content system may allow the images of a slideshow to be manipulated using conventional slideshow generation techniques. The content system plays the slideshow to the user by retrieving each image of the slideshow and displaying it on a display page. The content system may also create a slideshow package for presenting a slideshow and may also allow a user to name and select each of their slideshows.

Figure 4A:
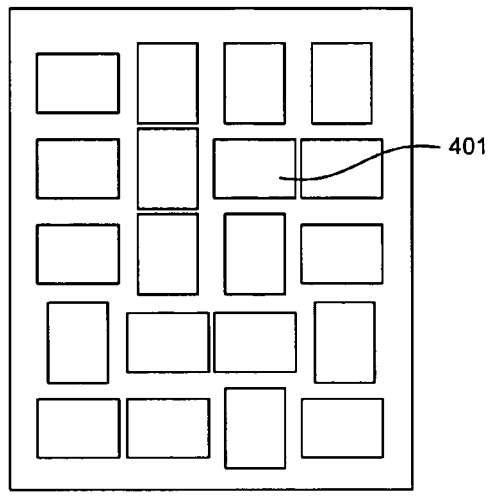
FIGS. 4A-4D illustrate various layouts of a grid area.
Figure 4B:
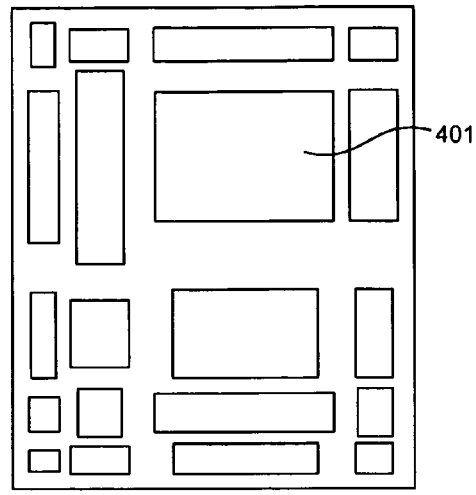
Figure 4C:
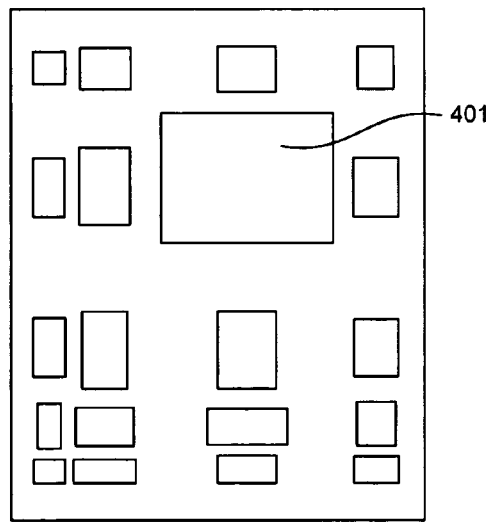
Figure 4D:
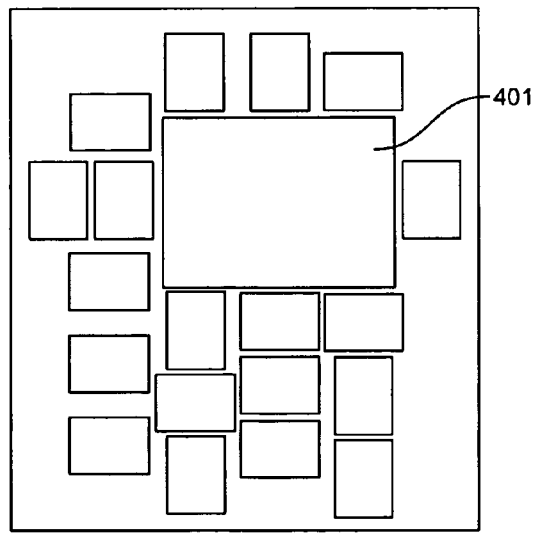

FIGS. 4A-4D illustrate various layouts of a grid area. FIG. 4A illustrates a conventional layout of thumbnails in which the thumbnails are aligned in rows and columns. FIG. 4B illustrates the layout of thumbnails using a conventional fisheye view. In this example, the user has selected a fisheye view of the images centered on image 401. In this conventional approach, the thumbnails are still aligned in rows and columns. However, the height of the rows and the width of the columns surrounding the center image have been changed resulting in a distortion of the aspect ratio of images other than image 401. A conventional fisheye view of images is described in Liu, H., Xie, X., Tang, X., Li, Z., and Ma, W., "Effective Browsing of Web Image Search Results," Microsoft Corporation, MSR-TR-2004-117, November 2004, which is hereby incorporated by reference. FIG. 4C illustrates a modified fisheye view of images that maintains row and column alignment. In this modified fisheye view, image 401 is enlarged. In this modified fisheye view, thumbnails immediately to the left and right of the center image have their heights unchanged, but their widths compressed, and the thumbnails immediately above and below the center image have their widths unchanged, but their heights compressed, but all other surrounding thumbnails are changed in both directions. FIG. 4D illustrates a second modified fisheye view that does not maintain a row and column alignment. In one embodiment, the content system applies a force transfer algorithm normally used for removing overlapping nodes in a graph to generate a modified fisheye view. The content system enlarges image 401 and then applies the force transfer algorithm to remove the overlap with the other thumbnails, which keep their original aspect ratios. A force transfer algorithm is described in Huang, X., and Lai, W., "Force-Transfer: A New Approach to Removing Overlapping Nodes in Graph Layout," $25^{th}$ Australian Computer Conference, Adelaide, Australia, 2003, which is hereby incorporated by reference. In addition, the content system may alternatively use a force scan algorithm to remove the overlap with the other thumbnails.

Figure 5:
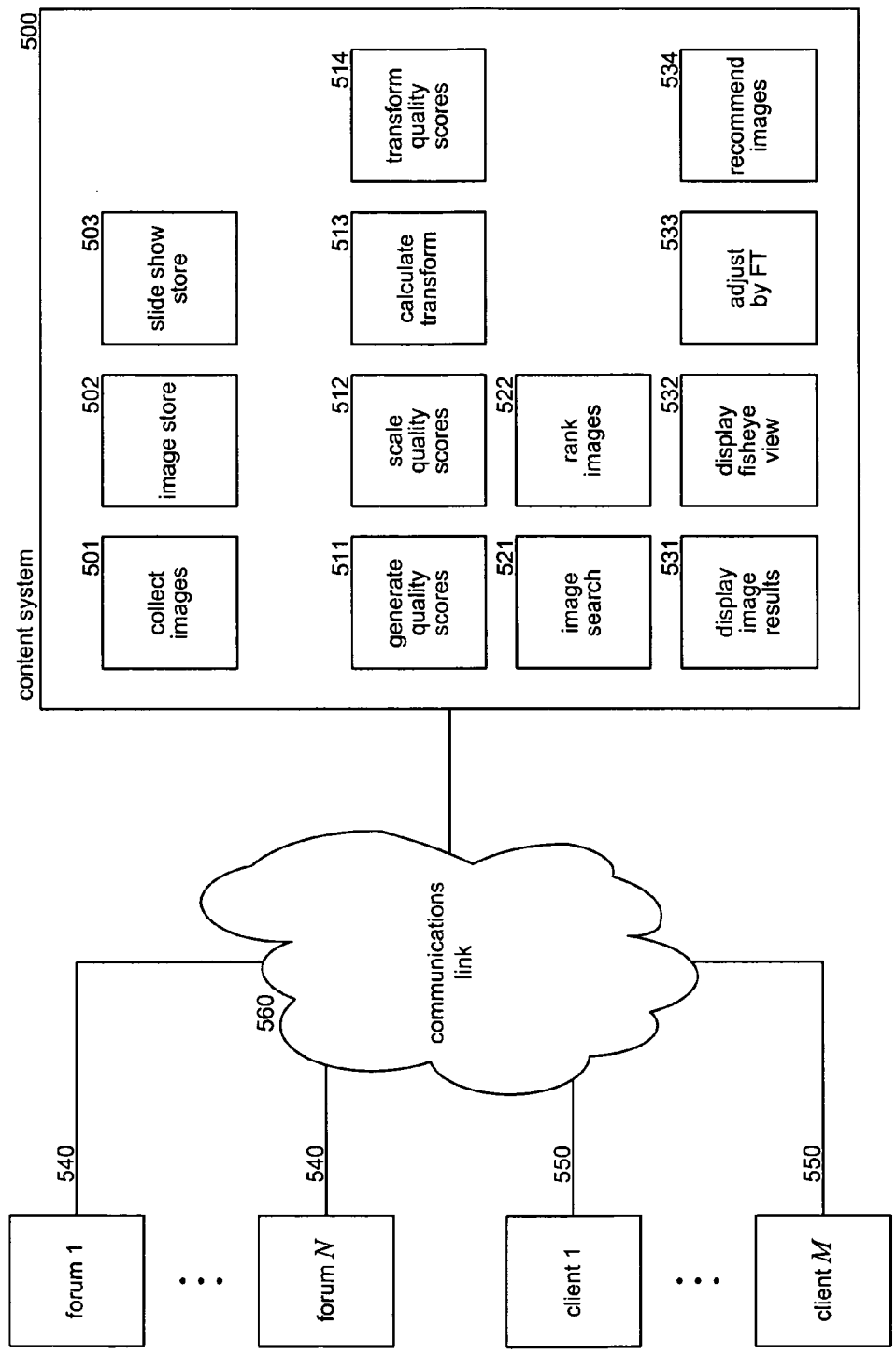
FIG. 5 is a block diagram that illustrates components of the content system in one embodiment.

FIG. 5 is a block diagram that illustrates components of the content system 500 in one embodiment. The content system may be connected to image forums 540 and client computers 550 via communications link 560. The content system includes a collect images component 501, an image store 502, and a slideshow store 503. The collect images component collects images from the various image forums and stores indexes to those images in the image store. For example, the collect images component may index the images based on text derived from the title and description metadata provided by the image forums. The collect images component may also index the images using a hash code derived from the content of the image that can be used to detect duplicate images. The slideshow store contains an entry for each slideshow of each user. An entry identifies the images of the slideshow. The content system also includes a generate quality scores component 511, a scale quality scores component 512, a calculate transforms component 513, and a transform quality scores component 514. The content system invokes the generate quality scores component to generate quality scores for the images of the image store. The generate quality scores component invokes the scale quality scores component to scale the quality scores and invokes the calculate transforms component to generate the transforms for each of the image forums. The content system then invokes the transform quality scores component to transform the scores of the various image forums. The content system includes an image search component 521 and a rank images component 522. The image search component searches the image store to identify images that may match a query submitted by a user. The image search component may generate a relevance score for each matching image using conventional techniques, such as a term frequency and inverse document frequency metric. The content system invokes the rank images component to rank the images based on a combination of the relevance score and quality score of the images as indicated by the image store. The content system includes a display image results component 531, a display fisheye view component 532, an adjust by force transfer component 533, and a recommend images component 534. After the images have been ranked, the content system invokes the display image results component to display the images to a user according to the ranking. When a user selects a thumbnail of an image, the content system may invoke the display fisheye view component to display a fisheye view of the selected image and surrounding images. The display fisheye view component may invoke the adjust by force transfer component to adjust the positions of the images surrounding the selected image. The content system may also allow a user to request recommendations for images. The content system may allow the user to select an image to serve as the basis for the recommendations. The content system then invokes the recommend images component to identify images to recommend, such as images within slideshows that contain the selected image.

The computing devices on which the content system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the content system. In addition, the data structures and message structures may be stored or transmitted via a data transmission medium, such as a signal on a communications link. Various communications links may be used, such as the Internet, a local area network, a wide area network, or a point-to-point dial-up connection.

The content system may be used to rank and view content using various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The content system may also provide its services to various computing systems such as personal computers, cell phones, personal digital assistants, consumer electronics, home automation devices, and so on.

The content system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the user interface component may be implemented on a server separate from the computer system that generates the quality scores and collects the images.

Figure 6:
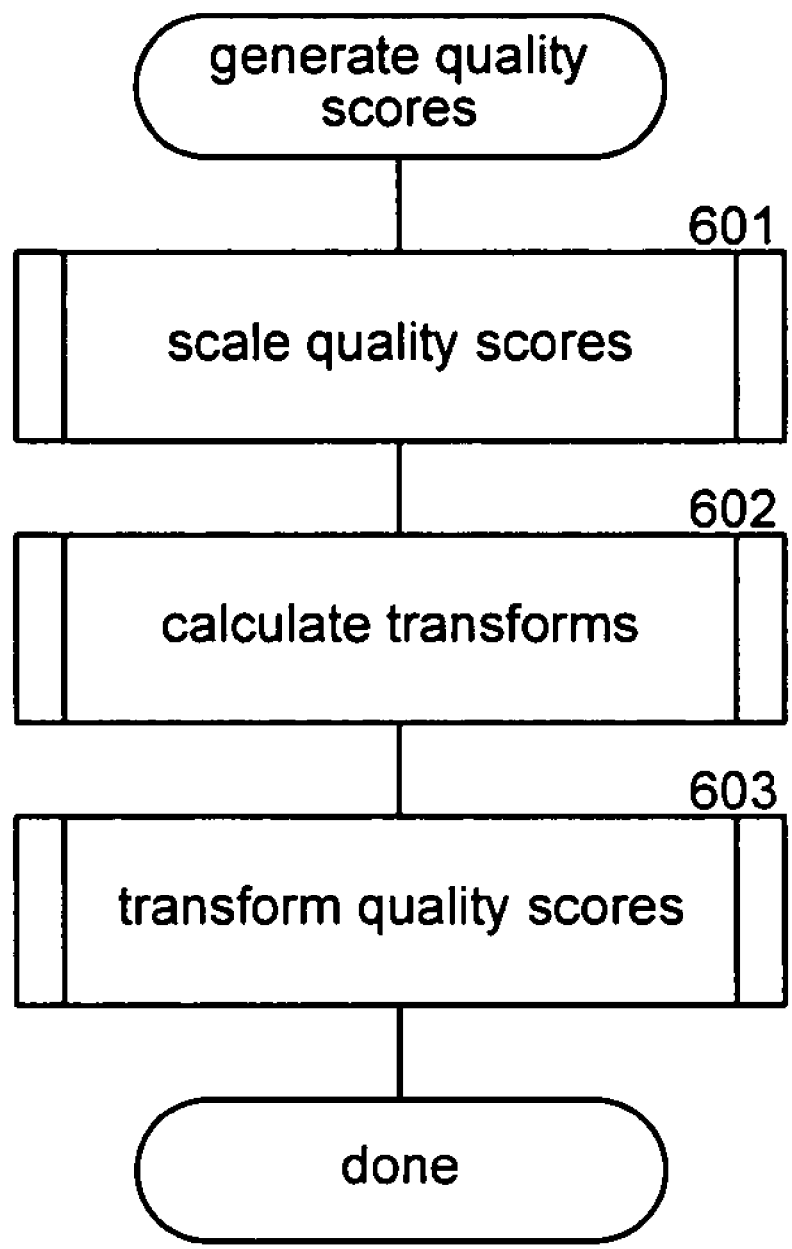
FIG. 6 is a flow diagram that illustrates the processing of the generate quality scores component of the content system in one embodiment.

FIG. 6 is a flow diagram that illustrates the processing of the generate quality scores component of the content system in one embodiment. The content system may invoke the component periodically to generate new quality scores for the images of the image store as updated information and new images are added to the image store. In block 601, the component invokes the scale quality scores component to scale the quality scores using a mode and high percentile technique. In block 602, the component invokes the calculate transforms component to generate a transform for each image forum. In block 603, the component invokes the transform quality scores component to transform the quality scores of each image of each image forum using the transform generated for that forum. The component then completes.

Figure 7:
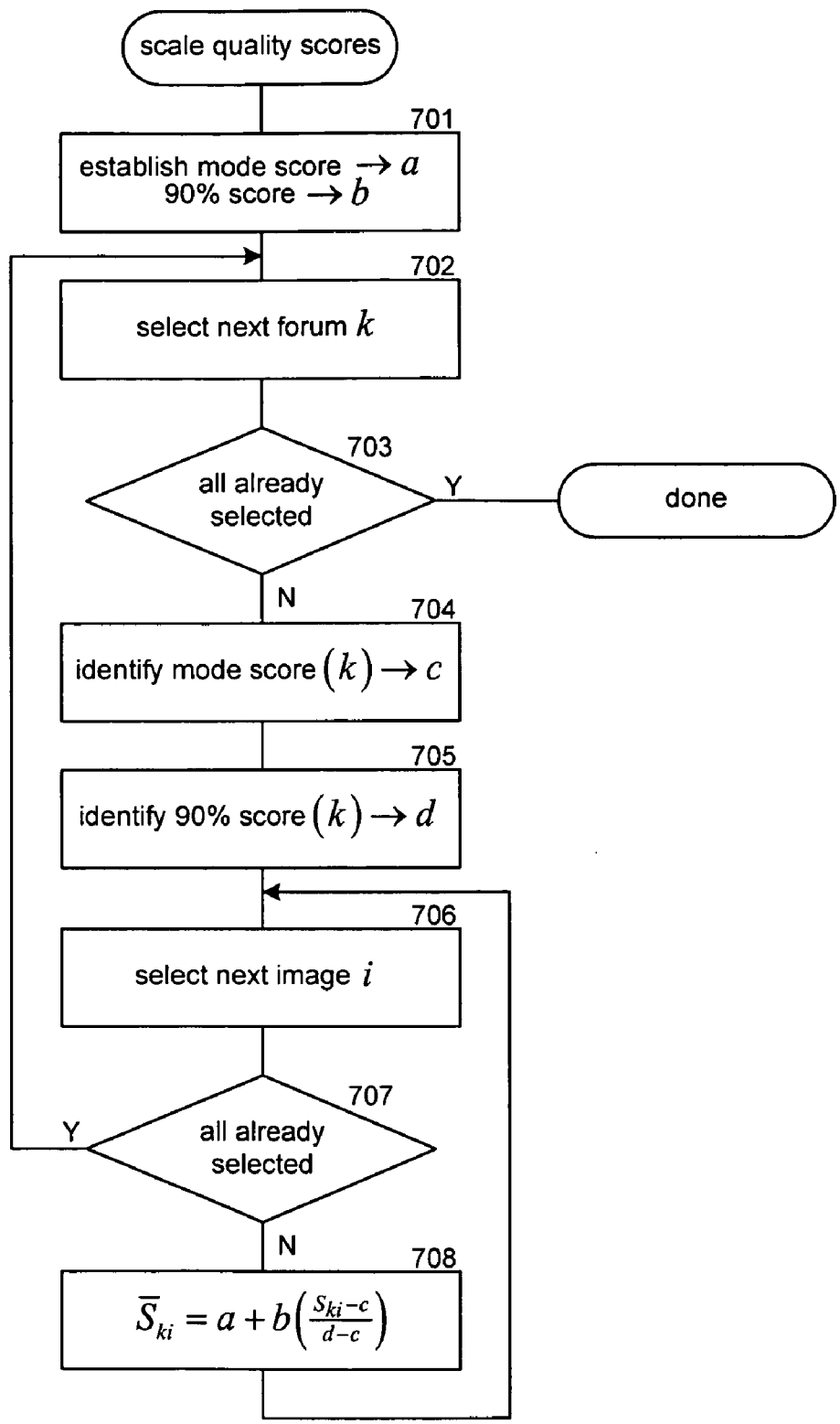
FIG. 7 is a flow diagram that illustrates the processing of the scale quality scores component of the content system in one embodiment.

FIG. 7 is a flow diagram that illustrates the processing of the scale quality scores component of the content system in one embodiment. The component scales the quality scores of the images of each image forum using a mode and high percentile technique. In block 701, the component establishes a reference mode score and a reference high percentile score.

For example, the reference scores may be derived from a reference image forum. In blocks 702-708, the component loops selecting each image forum and scaling its scores. In block 702, the component selects the next image forum. In decision block 703, if all the image forums have already been selected, then the component completes, else the component continues at block 704. In block 704, the component identifies the mode score for the selected image forum. In block 705, the component identifies the high percentile score for the selected image forum. In blocks 706-708, the component loops scaling the score of each image of the selected image forum. In block 706, the component selects the next image of the selected image forum. In decision block 707, if all the images have already been selected, then the component loops to block 702 to select the next image forum, else the component continues at block 708. In block 708, the component scales the score of the selected image based on the reference mode score and reference high percentile score and the mode score and high percentile score of the selected image forum. The component may use various linear and nonlinear techniques for scaling the scores. The component then loops to block 706 to select the next image of the selected image forum.

Figure 8:
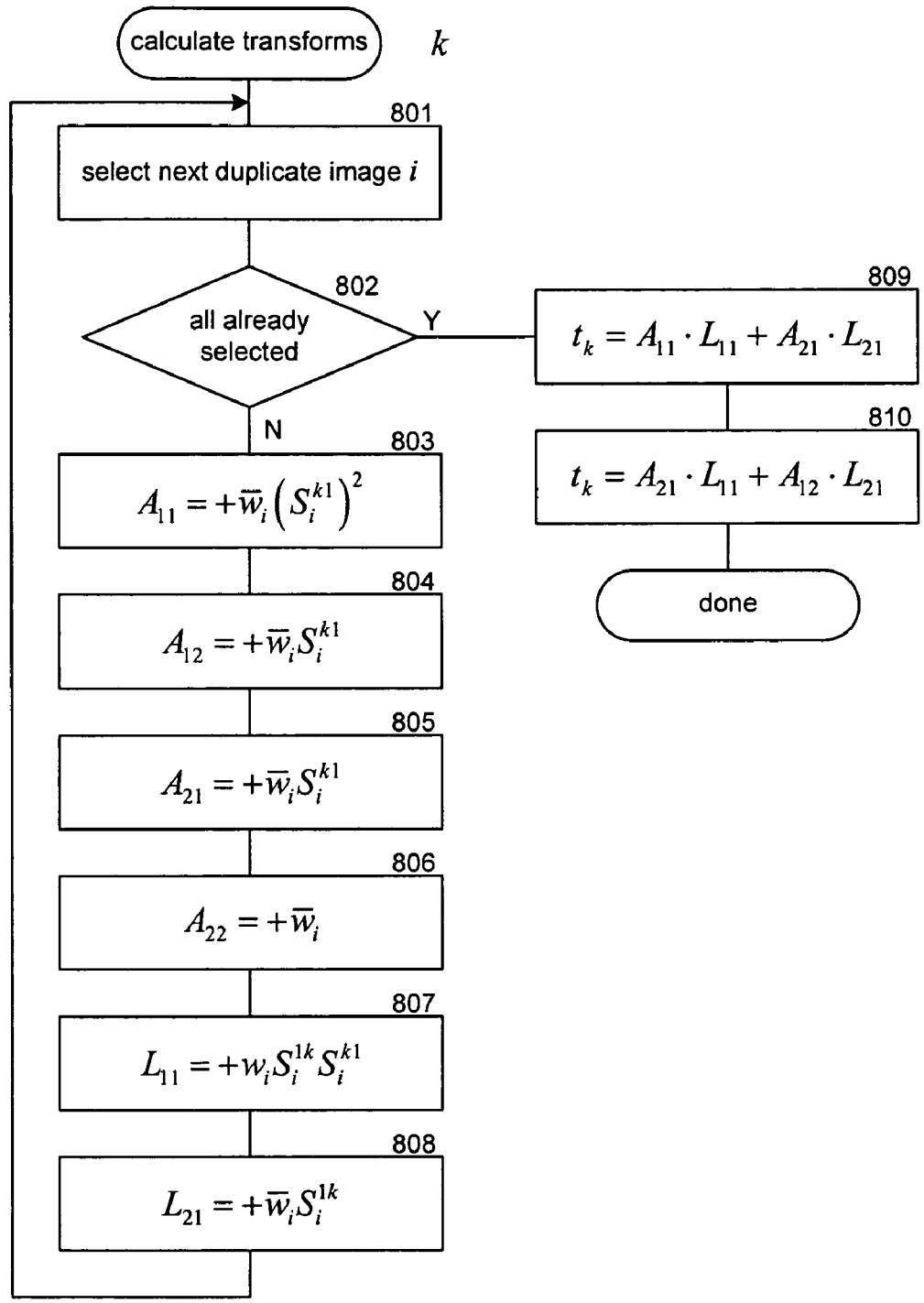
FIG. 8 is a flow diagram that illustrates the processing of the calculate transforms component of the content system in one embodiment.

FIG. 8 is a flow diagram that illustrates the processing of the calculate transforms component of the content system in one embodiment. The component is invoked to generate a transform for each non-reference image forum. Although not shown, the component loops selecting each image forum and performing the processing of blocks 801-810. In blocks 801-808, the component loops selecting each image of a target image forum that is a duplicate of an image in the reference image forum. The component calculates the elements for the matrices of Equations 7 and 8. In block 801, the component selects the next duplicate image. In decision block 802, if all the duplicate images have already been selected, then the component continues at block 809, else the component continues at block 803. In blocks 803-806, the component accumulates the values for the elements of the matrix of Equation 7. In blocks 807-808, the component accumulates the values for the elements of the matrix of Equation 8. The component then loops to block 801 to select the next duplicate image. In blocks 809-810, the component calculates the parameters for the linear model of Equation 3 using Equation 6. The component then completes. One skilled in the art will appreciate from this description that other models such as non-linear models may be used as the basis of the transforms.

Figure 9:
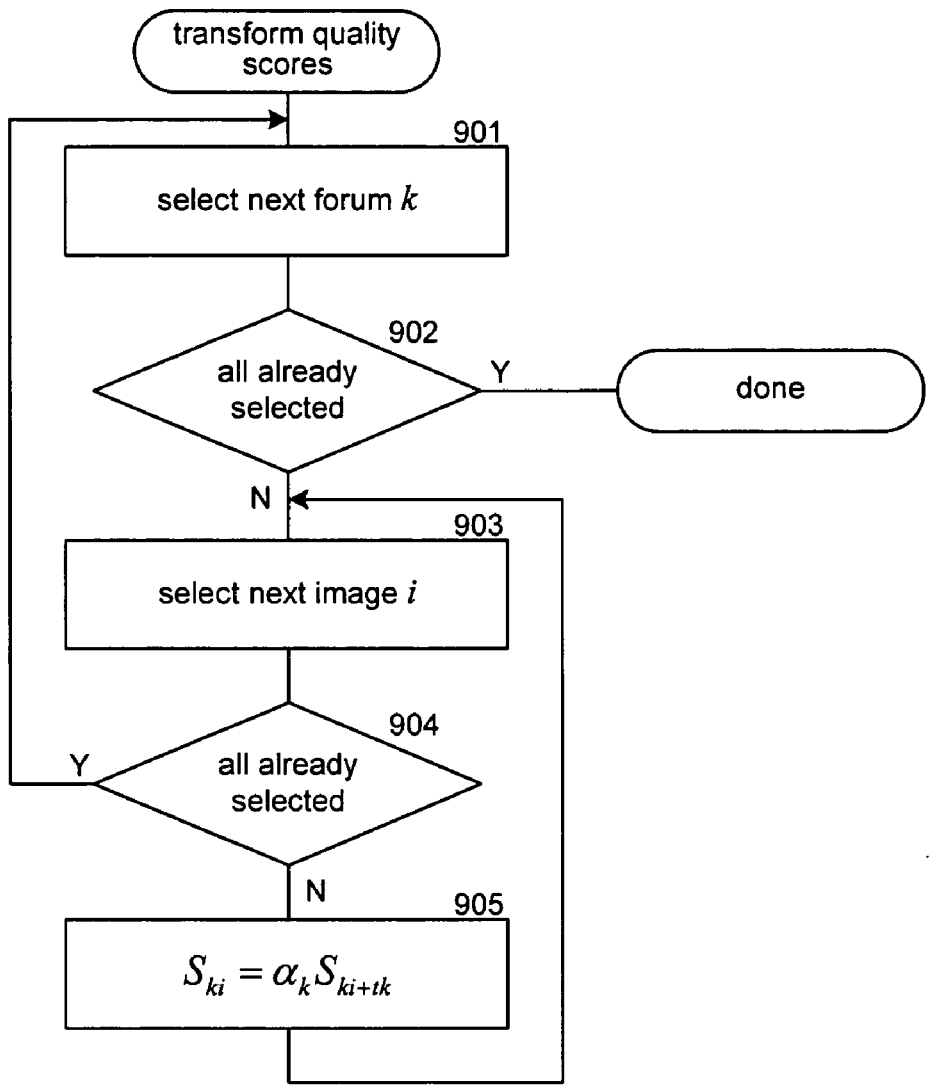
FIG. 9 is a flow diagram that illustrates the processing of the transform quality scores component of the content system in one embodiment.

FIG. 9 is a flow diagram that illustrates the processing of the transform quality scores component of the content system in one embodiment. The component transforms the quality scores of each image of each image forum using the transform of the image forum. In block 901, the component selects the next image forum. In decision block 902, if all the image forums have already been selected, then the component completes, else the component continues at block 903. In blocks 903-905, the component loops selecting each image of the selected image forum and transforming its score. In block 903, the component selects the next image of the selected image forum. In decision block 904, if all the images have already been selected, then the component loops to block 901 to select the next image forum, else the component continues at block 905. In block 905, the component transforms the quality score of the selected image using the transform for the selected image forum and Equation 3. The component then loops to block 903 to select the next image of the selected image forum.

Figure 10:
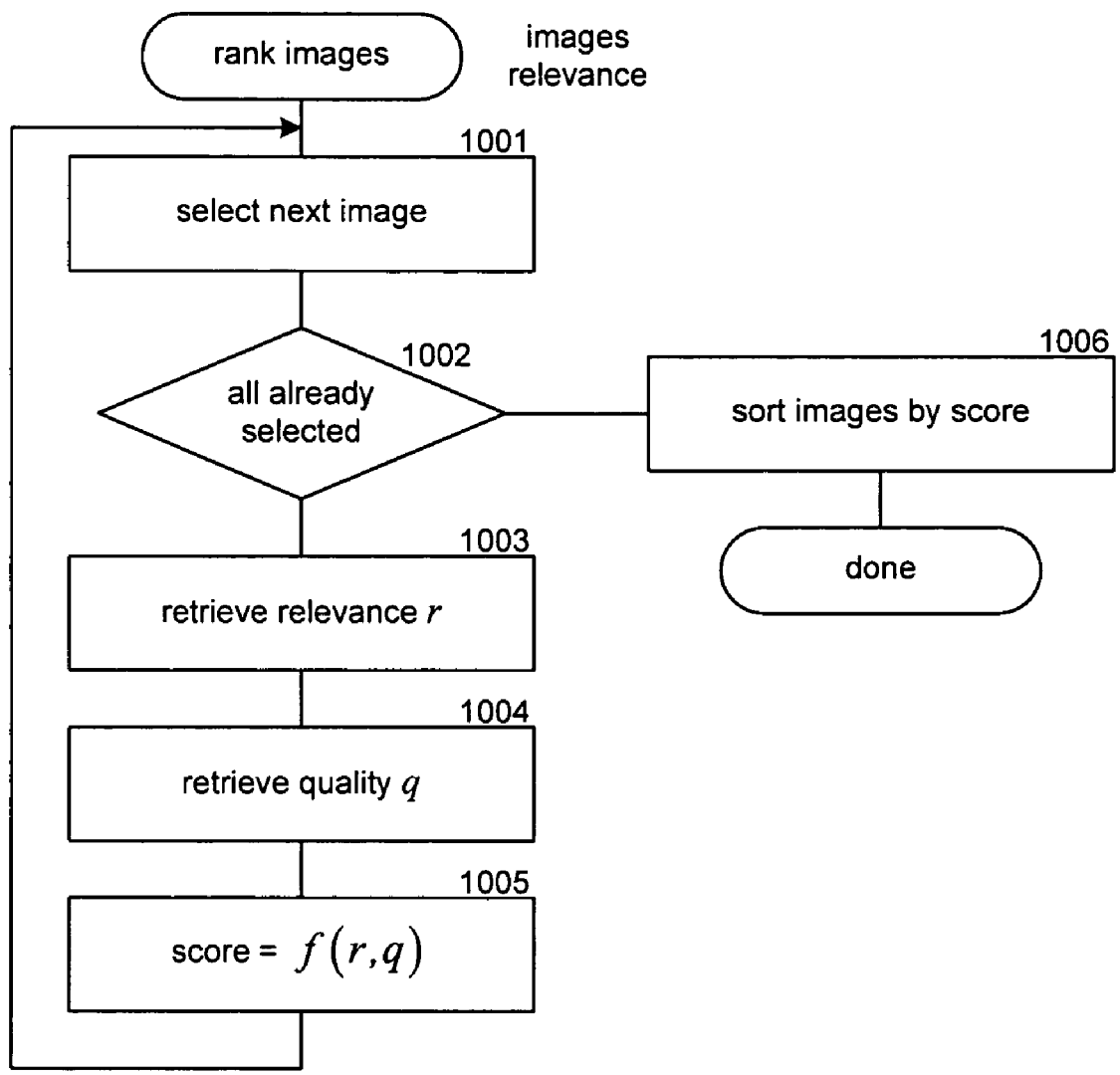
FIG. 10 is a flow diagram that illustrates the processing of the rank images component of the content system in one embodiment.

FIG. 10 is a flow diagram that illustrates the processing of the rank images component of the content system in one embodiment. The component is passed an indication of images and their relevance scores and generates a ranking score that combines the relevance score and quality score of each image and then sorts the images based on their ranking score. In block 1001, the component selects the next image. In decision block 1002, if all the images have already been selected, then the component continues at block 1006, else the component continues at block 1003. To be efficient, a typical search engine does not loop for every image. Instead, it uses indexing technique (such as inverted file) to quickly select a subset of images which are relevant to the user query. Then for each image in this subset, the search engine calculates its relevance score and quality score, and outputs a combined ranking score. In block 1003, the component retrieves the relevance for the selected image. In block 1004, the component retrieves the quality score for the image. The quality score may be derived objectively, subjectively, or a combination of objectively and subjectively. In one embodiment, the component retrieves from the image store the transform quality score for the selected image. In block 1005, the component combines the relevance and the transform quality into a ranking score using a function $f(r,q)$. The function may use various techniques for combining the relevance and quality scores. For example, the component may weight the scores differently, may weight the scores nonlinearly, and so on. The component then loops to block 1001 to select the next image to be ranked. In block 1006, the component sorts the images according to their ranking scores and then completes.

Figure 11:
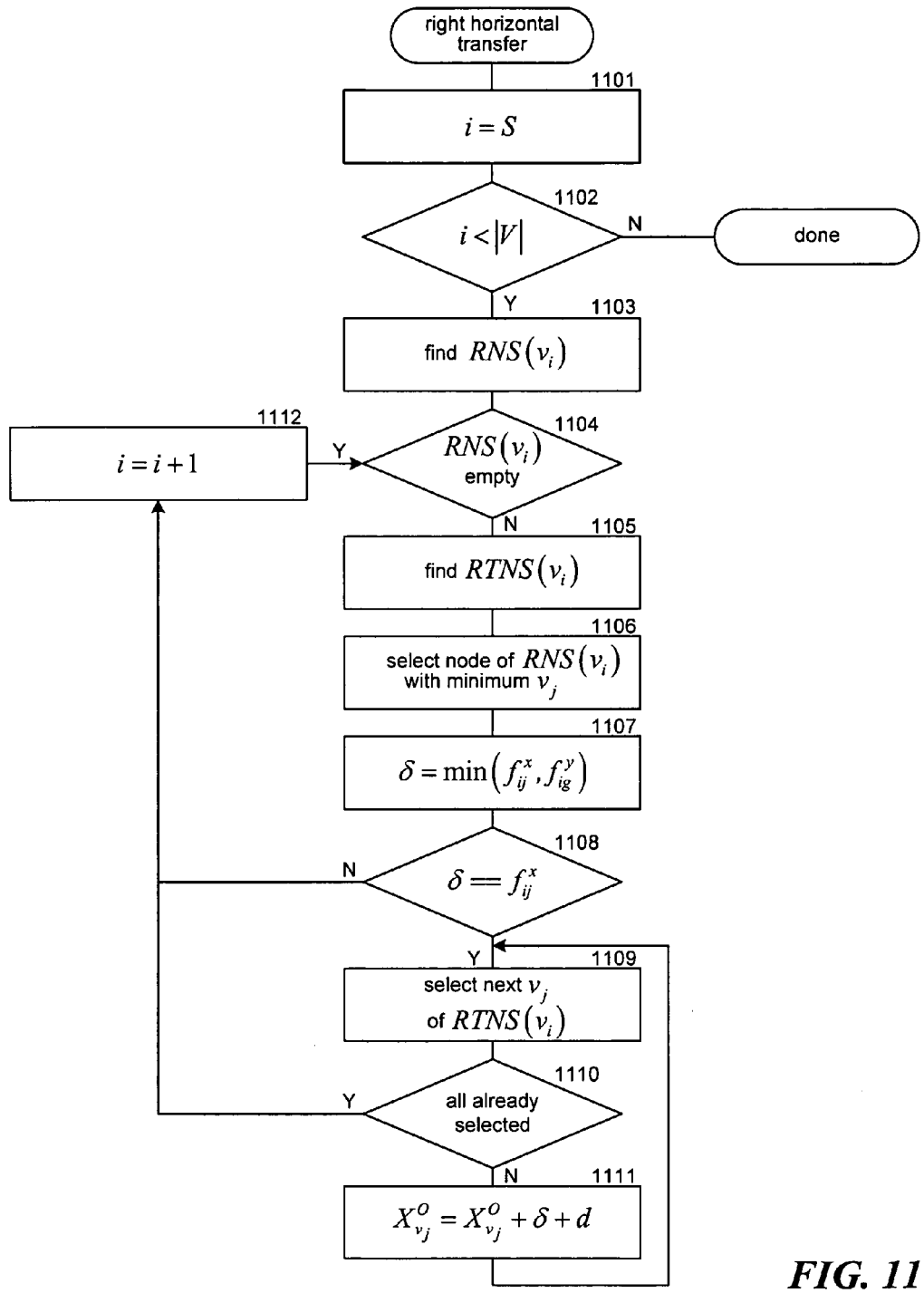
FIG. 11 is a flow diagram that illustrates the processing of a right horizontal transfer component of a force transfer algorithm in one embodiment.

FIG. 11 is a flow diagram that illustrates the processing of a right horizontal transfer component of a force transfer algorithm in one embodiment. The component assumes that nodes (e.g., thumbnails) have been sorted by their upper left x coordinate. The thumbnail that is the focus of the fisheye view has been enlarged. In block 1101, the component selects the node that is to be the focus of the display. In blocks 1102-1112, the component loops selecting each of the nodes to the right of the currently selected node. In decision block 1102, if all the nodes to the right have already been selected, then the component completes, else the component continues at block 1103. In block 1103, the component finds the right neighbor nodes of the selected node. In decision block 1104, if the selected node has no right neighbor nodes, then the component continues at block 1112, else the component continues at block 1105. In block 1105, the component identifies the right neighbor nodes to which the force is to be applied. In block 1106, the component selects a right neighbor node that is leftmost. In block 1107, the component calculates the vertical and horizontal transfer forces. In decision block 1108, if the horizontal transfer force is greater than the vertical transfer force, then the component continues at block 1109, else the component continues at block 1112. In blocks 1109-1111, the component loops transferring force to the nodes to the right (repositioning them). The component then continues at block 1112. In block 1112, the component selects the next node in order and then loops to block 1102.

Figure 12:
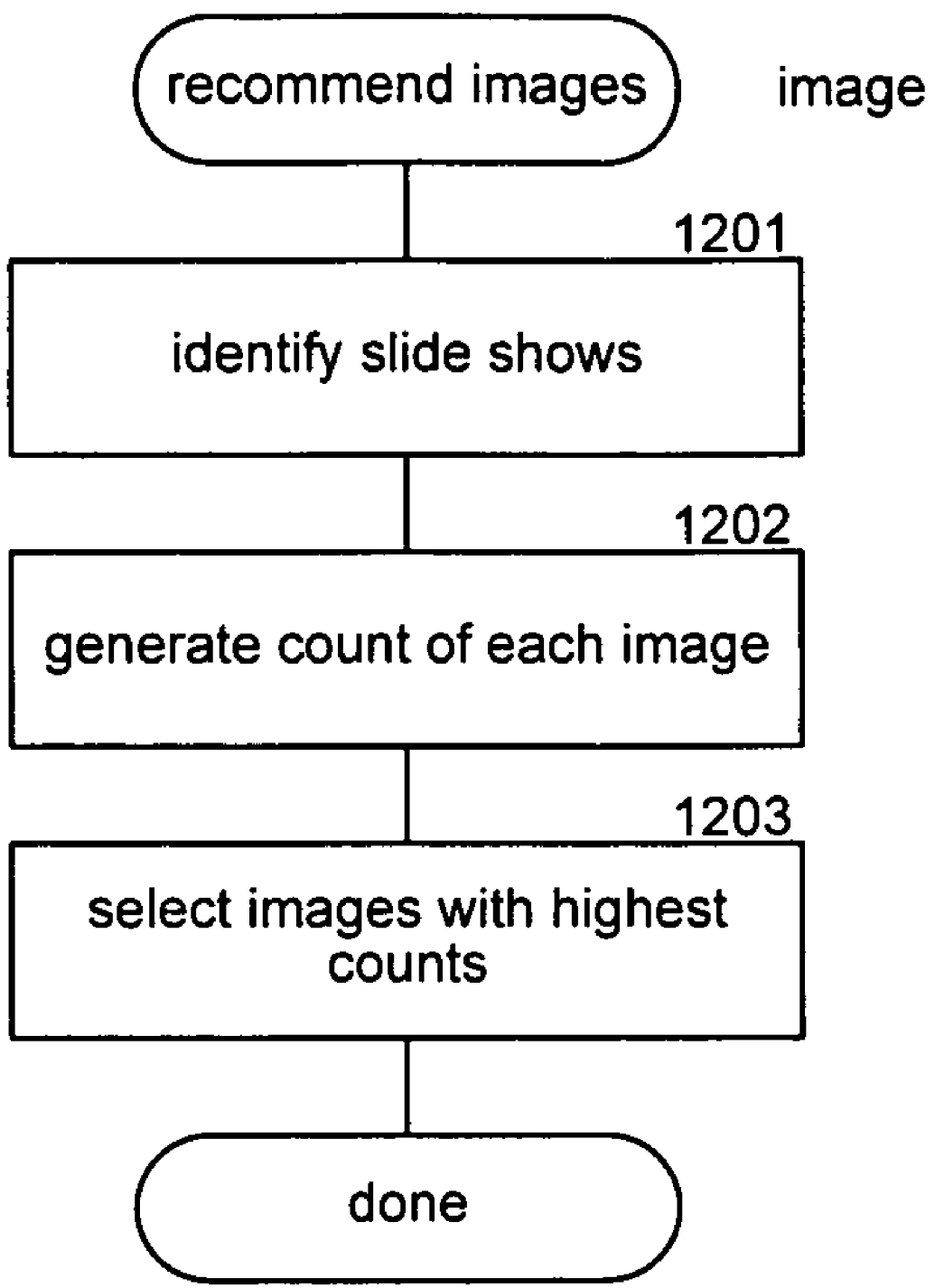
FIG. 12 is a flow diagram that illustrates the processing of the recommend images component of the content system in one embodiment.

FIG. 12 is a flow diagram that illustrates the processing of the recommend images component of the content system in one embodiment. The component is passed an image and identifies related images to recommend. In this embodiment, the component determines relatedness based on membership in slideshows. In block 1201, the component identifies the slideshows that contain the image that is the basis of the recommendation. In block 1202, the component generates a count for each image of the slideshows that indicates the number of the identified slideshows that contain that image. In block 1203, the component selects the images with the highest counts to recommend. The component then completes. The content system may use collaborative filtering techniques to recommend images. A collaborative filtering technique may identify similarities between images based on the behavior of users. The content system can base recommendations on rating information of reviewers, image content similarity, and so on.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. A content forum can be any collection of content that has a quality rating for the content. For example, the content forum may be a database containing rating of content, a web service that provides content ratings, and so on. In addition, the rating and the content may be provided by different services. For example, one server may publish content for sale, and another service may provide ratings for the content. Moreover, the content system may be adapted to provide rankings for items other than content such as vehicles, consumer electronics, books, and so on. Accordingly, the invention is not limited except as by the appended claims.

The invention claimed is:

1. A computing system for ranking items of results, the items being images stored at a plurality of image forums that allow users to upload images and to provide ratings of the images, comprising:
   a result store providing an indication of the items of a result of a query of words, the items of the result having been identified as matching the query after the query was received;
   a relevance store providing a relevance for each item of the result, the relevance being based on comparison of the words of the query to words associated with the items, the relevance of the items indicating a ranking of the items;
   a quality store providing a quality for each item of the result, the quality being independent of the query, being determined before the query was received, and being based on a rating of the items provided by users of the image forums who reviewed the items, the quality being derived from a normalization of the ratings of images of the image forums to account for differences in rating scales and rating criteria of the image forums; and
   a generate score component that generates a score for each item based on a combination of the relevance and the quality for the item, the generated scores indicating a re-ranking of the items to factor in the quality of the items as derived from the image forums.

2. The system of claim 1 wherein the items of the result are selected based on a user query and the relevance of an item is based on relatedness of the item to the user query.

3. The system of claim 1 including a display component that displays an indication of the items in an order based on the generated scores.

4. The system of claim 3 wherein the items are images and the indication of an image is a thumbnail of the image and wherein the display component displays a fisheye view of the images when a user selects an image.

5. The system of claim 1 wherein the ratings of duplicate images from different image forums are used to generate a transform for ratings of different image forums.

6. A computer-readable medium containing instructions for controlling a computing system to rank images of a result of a query, by a method comprising:
   for each of a plurality of image forums that allow users to upload images and reviewers to provide ratings of the images, collecting metadata associated with images of the image forum, an image forum being a web server that allows users to upload images and reviewers to provide ratings of the uploaded images, the metadata of an image including a rating of quality of the image and information describing the image, the rating of the quality of an image being provided by a reviewer of the image;
   normalizing the ratings of quality across the plurality of image forums to account for differences in rating scales and rating criteria of the image forums; and
   after collecting the metadata,
      receiving a query having words;
      identifying images of the plurality of image forums as the result of the query based on comparison of words of the query to the information describing the images;
      determining relevance of each identified image to the query based on similarity between words of the query and the information describing the identified image;
      determining a quality for each image of the result of the query based on the normalized ratings of quality across the plurality of image forums;
      generating a score for each image based on the quality for the image and relevance of the image to the query; and
      outputting an indication of identified images in an order based on the generated score
   such that the images are ordered based on a relevance that is query dependent and a quality that is query independent so that images of higher quality are ordered higher than images of lower quality with the same relevance.

7. The computer-readable medium of claim 6 wherein the rating of an image is adjusted based on the ratings differences between image forums as indicated by ratings of duplicate images.

* * * * *